United States Patent
Berns et al.

(10) Patent No.: US 9,516,503 B2
(45) Date of Patent: Dec. 6, 2016

(54) LOCATION BASED ACCESS

(71) Applicant: Aruba Networks Inc., Sunnyvale, CA (US)

(72) Inventors: Adam Michael Berns, San Jose, CA (US); Santhosh Cheeniyil, Saratoga, CA (US); Madhava K. Kidambi, Sunnyvale, CA (US); Varun A. Shah, Sunnyvale, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 190 days.

(21) Appl. No.: 14/069,050

(22) Filed: Oct. 31, 2013

(65) Prior Publication Data

US 2015/0121465 A1    Apr. 30, 2015

(51) Int. Cl.
| | |
|---|---|
| *H04W 12/08* | (2009.01) |
| *H04L 29/06* | (2006.01) |
| *H04W 4/02* | (2009.01) |
| *G07C 9/00* | (2006.01) |
| *G06F 21/30* | (2013.01) |
| *H04W 12/06* | (2009.01) |

(52) U.S. Cl.
CPC .............. *H04W 12/08* (2013.01); *G07C 9/00* (2013.01); *G07C 9/00174* (2013.01); *H04L 63/105* (2013.01); *G06F 21/30* (2013.01); *G07C 9/00007* (2013.01); *G07C 9/00126* (2013.01); *H04W 4/02* (2013.01); *H04W 4/021* (2013.01); *H04W 4/025* (2013.01); *H04W 12/06* (2013.01)

(58) Field of Classification Search
CPC G07C 9/00007; G07C 9/00; G07C 9/00126; G07C 9/00174; E05Y 2900/00; H04L 63/08; H04L 63/10; H04L 63/083; H04L 63/105; H04W 12/06; H04W 12/08; H04W 4/02; H04W 4/021; H04W 4/025; G06F 21/30
See application file for complete search history.

(56) References Cited

U.S. PATENT DOCUMENTS

| | | | | |
|---|---|---|---|---|
| 2002/0067259 A1* | 6/2002 | Fufidio | ............ | G07C 9/00031 340/541 |
| 2004/0153671 A1* | 8/2004 | Schuyler | ............ | G07C 9/00111 726/9 |
| 2006/0164208 A1* | 7/2006 | Schaffzin | ............ | G07C 9/00182 340/5.64 |
| 2009/0168695 A1* | 7/2009 | Johar et al. | ............ | 370/328 |
| 2011/0316695 A1* | 12/2011 | Li | ............ | G01S 5/02 340/539.13 |
| 2012/0010923 A1* | 1/2012 | Yarmolich | ............ | G06Q 20/10 705/7.32 |

* cited by examiner

*Primary Examiner* — Morshed Mehedi
*Assistant Examiner* — Ayoub Alata
(74) *Attorney, Agent, or Firm* — Mannava & Kang, P.C.

(57) ABSTRACT

A non-transitory computer readable medium for location based access includes instructions which, when executed by one or more devices, causes performance of operations including identifying a physical location of a client device, determining that the physical location of the client device meets a criterion for allowing access through an entryway, identifying a permission level associated with the client device, determining that the permission level associated with the client device meets a criterion for allowing access through the entryway, and, responsive at least to determining that the criterion have been met, allowing access through the entryway.

19 Claims, 3 Drawing Sheets

LOCATION BASED ACCESS

BACKGROUND

Controlling access or entry to services and locations is a frequent problem for businesses, individuals, and others. Traditionally, access has been controlled in many different ways, from stationing a person to monitor the access, to using a lock and key, and many other solutions. In any solution, there is a balancing between the cost of implementing the solution, the burden of implementing the solution, and the success rate of controlling the access, among other considerations. New solutions with low cost, low burden, and high success are always desirable.

OVERVIEW

In general, in one aspect, embodiments relate to a non-transitory computer readable medium storing instructions for location based access. The instructions, when executed by one or more devices, causes performance of operations comprising identifying a physical location of a client device, determining a distance and a direction of the first client device from at least one access point, determining that the physical location of the client device meets a criterion for allowing access through an entryway, identifying a permission level associated with the client device, determining that the permission level associated with the client device meets a criterion for allowing access through the entryway, and, responsive at least to determining that the criterion have been met, allowing access through the entryway.

In general, in one aspect, embodiments relate to a system for location based access. The system includes at least one network device including a hardware processor. The system is configured to perform operations comprising identifying a physical location of a client device, determining that the physical location of the client device meets a criterion for allowing access through an entryway, identifying a permission level associated with the client device, determining that the permission level associated with the first client device meets a criterion for allowing access through the entryway, and, responsive at least to determining that the criterion have been met, allowing access through the entryway.

Other aspects and advantages will be apparent from the following description and the appended claims.

DETAILED DESCRIPTION

Figure 1:
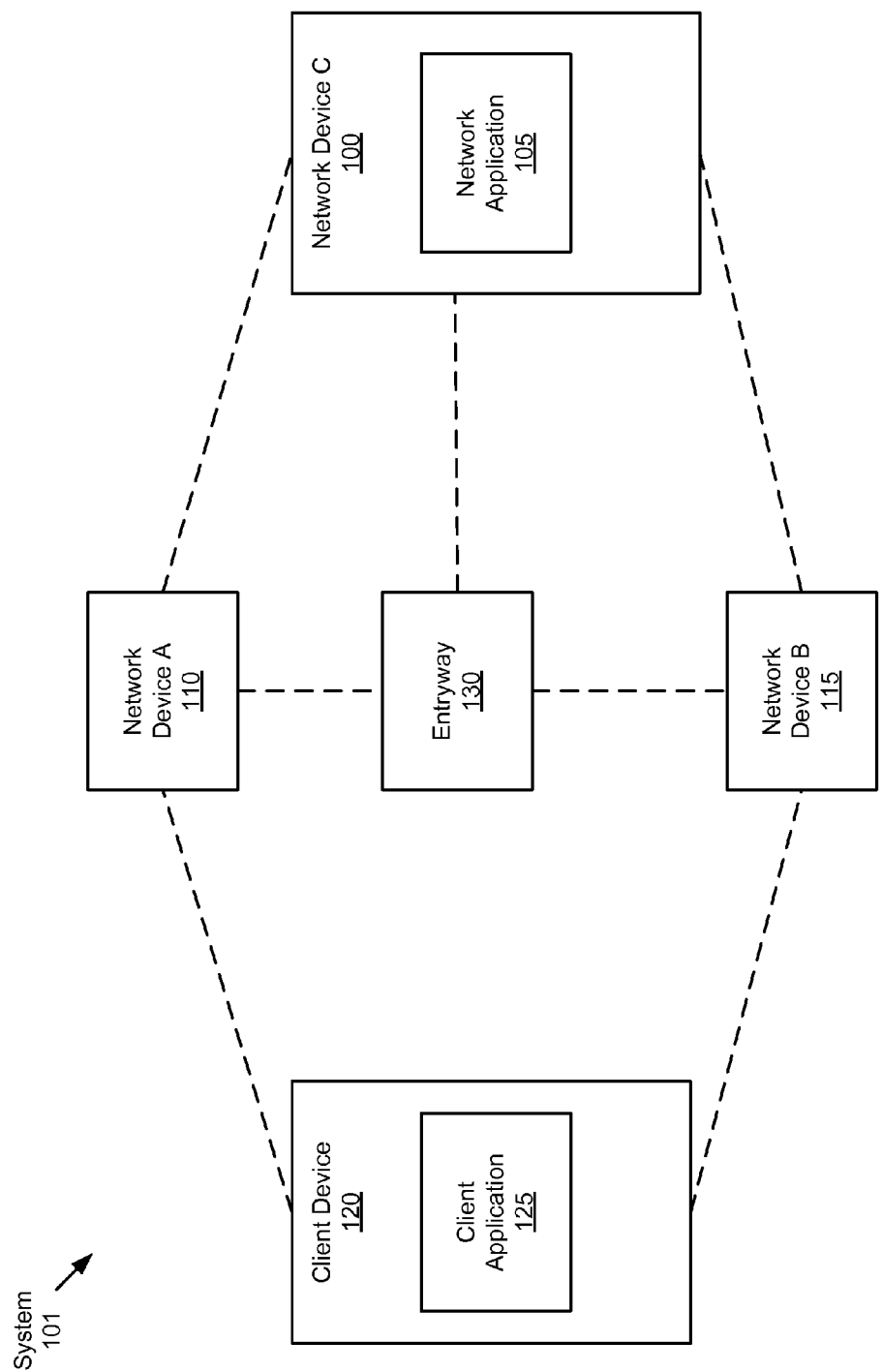
FIG. 1 shows a schematic diagram in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

In general, embodiments provide a computer readable medium, a method, and a system for location based access. Both the physical location of a client device and a permission level associated with the client device are identified. Subsequently, a determination is made whether the physical location meets a criteria for allowing access through an entryway, and whether the permission level associated with the client device meets a criteria for allowing access through the entryway. When both conditions are true, access is granted through the entryway.

As an initial note, it is important to distinguish the present embodiments from other methods. One solution for controlling access includes using radio-frequency identification (RFID). Specifically, a tag is created that stores the desired user information (e.g., name, age, home address, etc.). The information stored on the tag may then subsequently be read. Many common tags (such as an ID badge) are readable from only a few meters or less. When using the RFID tag, the user taps his RFID tag on a receiver/scanner, which then reads the tag. Access may then be granted or denied. Without tapping the tag on the scanner/receiver, the location of the tag is not be known. Further, it is only after the tag has transmitted its information that a determination whether to grant or deny access can be made (i.e., such a determination cannot be made prior to the tag making contact with the scanner/receiver).

FIG. 1 shows a system (101) in accordance with one or more embodiments. As shown in FIG. 1, the system (101) has multiple components, including one or more network devices (e.g. network device A (110), network device B (115), network device C (100)), a client device (120), and an entryway (130). A network application (105) is executing on network device C (100) and a client application (125) is executing on the client device (120). The network devices (100, 110, 115) may be installed on walls or ceilings near the entryway (130).

In one or more embodiments, the client device (120) may be a computing system capable of wirelessly sending and/or receiving information. For example, the client device (120) may be a laptop computer, smart phone, personal digital assistant, tablet computer, or other mobile device.

In one or more embodiments, each network device (100, 110, 115) is a hardware device that is configured to receive packets (e.g., unicast packets, multicast packets) and transmit the packets to the client device(s) connected to the network device. A network device might also be configured to receive packets from a client device and transmit the packet to other network devices. The network device may include one or more hardware processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The hardware processor(s) may be an integrated circuit for processing instructions. For example, the hardware processor(s) may be one or more cores, or microcores of a processor.

By way of an example, a client device may be directly wired or wirelessly communicatively connected to a single access point, which is directly communicatively connected to a single controller, which is connected to a network (not shown). In the example, the network device may be the access point, the controller, an access point that includes the functionality of a controller, a switch (e.g., mobility access switch), or other such device. Additionally, by way of an example, one network device may be a controller while another network device may be an access point. The network device that is the access point in the example may or may not be connected to the network via the network device that is a controller.

Access points are digital devices that may be communicatively coupled to one or more networks (e.g., Internet, an intranet, etc.). Access points may be directly connected to the one or more networks or connected via a controller. In other words, an access point may be directly connected to a particular controller. An access point may include a wireless access point (WAP) that communicates wirelessly with devices using Wi-Fi, Bluetooth or related standards and that communicates with a wired network.

The network application (105) includes functionality for identifying the physical location of client devices (e.g., client device (120)), determining whether physical locations satisfy one or more criteria, creating and identifying permission levels, determining whether permission levels satisfy one or more criteria, allowing access, sending alerts, and other functionalities as needed for implementing the embodiments.

In one or more embodiments, network application (105) may work in conjunction with the various network devices (e.g., network device C (100), network device A (110), and network device B (115)) to identify the physical location of client devices. Alternatively or additionally, a single network device may identify the location of client devices. Specifically, Wi-Fi may be used to identify the physical location of client devices using any suitable method, such as Wi-Fi triangulation, or other technology. In Wi-Fi triangulation, the strength of the signal(s) received by various network devices is measured. Through the relative strengths of the signals, and the known locations of the network devices, the location of client device can be determined with very high accuracy. It will be apparent to one of ordinary skill in the art that there are many ways to identify location using Wi-Fi and, as such, the embodiments should not be limited to the above examples.

The use of Wi-Fi for identifying the locations of client devices has many advantages. First, no additional software is needed for the vast majority of client devices—whether the client device is a mobile phone, laptop, netbook, smartwatch, smartglasses, or other device, most modern devices include functionality to send and receive Wi-Fi signals. This base functionality is sufficient to identify the location of the associated device using Wi-Fi based methods. Additionally, the ease of use by the user (i.e., operator of the client device) is high—the user does not need to take any actions. For example, a user may be able to access an entryway without accessing their client device or even removing their client device from their pocket, backpack, or other container. Further, Wi-Fi based location identification is able to track many different client devices simultaneously and therefore eliminates the need for multiple devices to line up to use a receiver, such as when a line forms waiting to use an RFID point (i.e., scanner/receiver).

In one or more embodiments, access to the Wi-Fi network(s) is restricted by a password, or other suitable security measures. When a client device successfully logs on to the protected Wi-Fi network, the client device may be authenticated by the network devices (e.g., network device C (100), network device A (110), and network device B (115)), and the permission levels associated with the client device may be identified. In one or more embodiments, network application (105) includes functionality for a user, such as an administrator or security professional, or any other suitable user, to create and manage permission levels. Permission levels may be associated with specific users/client devices, and specify whether the user/client device has access to a given location (e.g., entryway (130)). In one or more embodiments, permission levels may be set on a per-user or per-client device basis, in addition to individual settings for different access points (e.g., a first entryway and a second entryway). The permission levels may be created or managed in any manner now known or later developed.

In one or more embodiments, network application (105) includes functionality for calculating distances using the physical location of the client device. For example, the distance between a client device and an entryway, or any other location, may be calculated. The distance may be calculated in any manner now known or later developed. Further, the distance between different devices may be calculated and used, for example, to determine when a second client device is "piggybacking" onto another device (e.g., when an unauthorized user walks closely behind an authorized user when walking through an entryway), and for many other purposes.

In one or more embodiments, network application (105) includes functionality for setting one or more criteria for access to entryways, doors, locks, and/or any other suitable location. The criteria may specify a distance from the entryway, such as 2 feet, 10 feet, etc. at which point the entryway will be opened (assuming permission is granted). Alternatively, the criteria may set a predefined zone at some location. For example, the predefined zone may be a 5 foot by 5 foot box (or any other shape) on a sidewalk leading up to the entryway. The box could be positioned such that, for example, when walking at a normal speed, the entryway would be fully opened by the time the user arrived at the door. It will be apparent to one of ordinary skill in the art that there are many different ways to set criteria for access and, as such, the embodiments should not be limited to the above examples.

In one or more embodiments, network application (105) includes functionality for sending alerts based on the location(s) of client devices. For example, an alert may be sent when a client device is determined to be located in an area that the user of the client device is not permitted to be. The alert may be sent to any suitable device or location, using any method now known or later developed.

In one or more embodiments, client application (125) is a software application executing on the client device (120) that includes the functionality needed for interaction with the network devices. Client application (125) may be installed by the user of client device (120) or may come pre-installed by the manufacturer. In one or more embodiments, client application (125) is part of the operating system, or other standard pre-installed software, of client device (120), as the embodiments may be practiced without the installation of specialized software on client devices.

In one or more embodiments, entryway (130) is a door, entryway, lock, container, or other suitable device. Specifically, entryway (130) is the device to which access is being controlled. In one or more embodiments, one or more components of entryway (130) is communicatively connected to a Wi-Fi network and/or network devices (e.g., network device C (100), network device A (110), and network device B (115)), enabling the network devices to send messages to open/close the entryway (130). It will be apparent to one of ordinary skill in the art, having the benefit of this detailed description, that entryway (130) may be anything to which access may be controlled and, as such, the embodiments should not be limited to the above examples.

Figure 2:
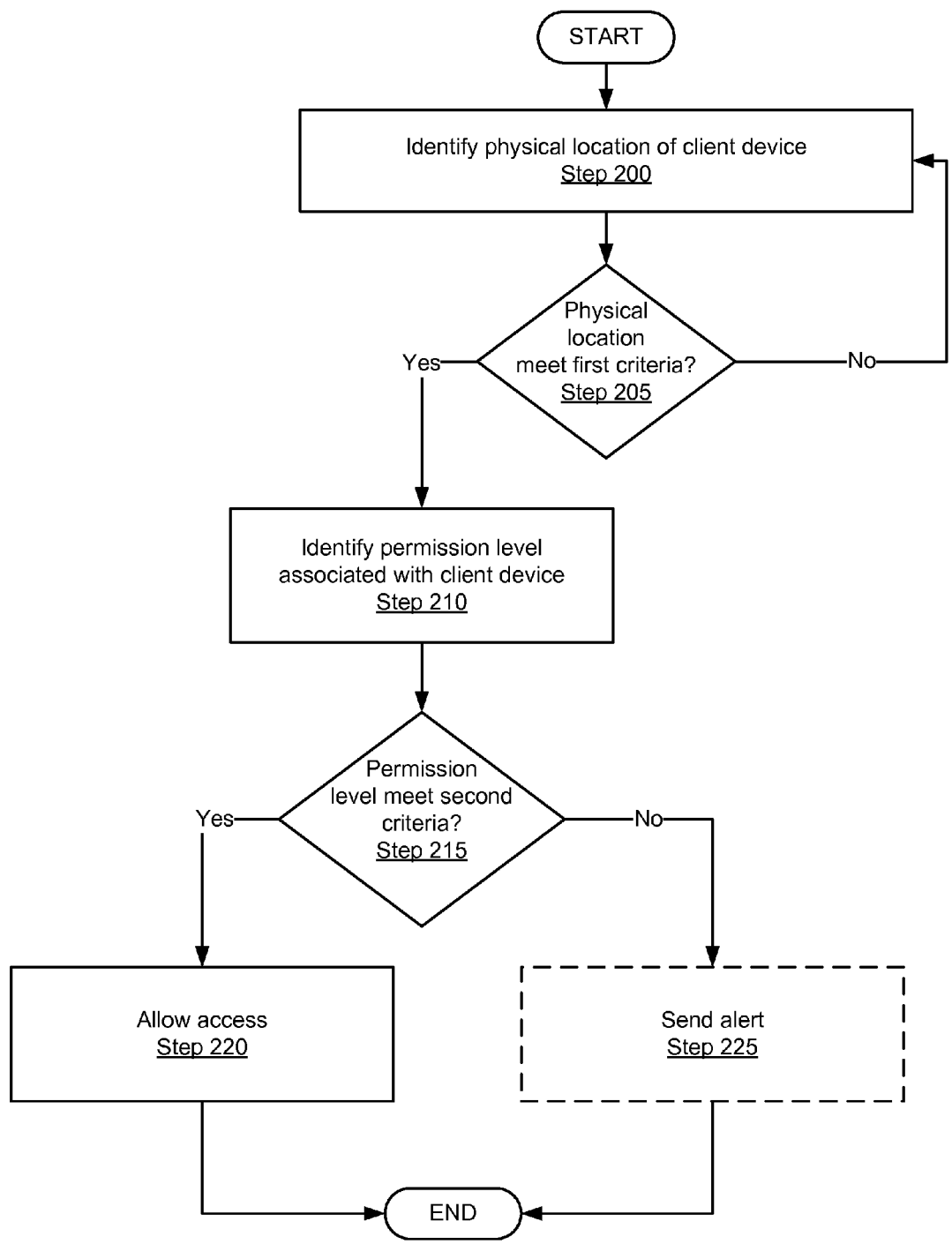
FIG. 2 shows a flowchart of a method in accordance with one or more embodiments.

FIG. 2 shows a flowchart of a method for location based access. While the various steps in this flowchart are presented and described sequentially, one of ordinary skill in the art will appreciate that some or all of the steps may be executed in different orders and some or all of the steps may be executed in parallel. Further, in one or more embodiments, one or more of the steps described below may be omitted, repeated, and/or performed in a different order. Accordingly, the specific arrangement of steps shown in FIG. 2 should not be construed as limiting the scope of the embodiments.

In Step 200, a physical location of a client device is identified, in accordance with one or more embodiments. The location of client devices may be identified using Wi-Fi triangulation, or other Wi-Fi location technologies. In one or more embodiments, identifying the location of the client device requires no action on the part of the user of the client device. The identification of the physical location of the client device may occur, for example, as soon as the client device comes within Wi-Fi range of network devices, when the client device successfully logs on to a Wi-Fi network, or at any other suitable moment.

In Step 205, a determination is made whether the physical location meets a first criterion associated with the entryway, in accordance with one or more embodiments. The determination may be made in any manner now known or later developed. The criterion may be a distance threshold (e.g., within 5 feet of the entryway, within 10 feet of the entryway, etc), whether the physical location is within a predetermined zone (e.g., a particular part of a sidewalk, etc), etc. If the physical location does not meet the first criterion, the method returns to Step 200. If the physical location does meet the first criterion, then the method proceeds to Step 210.

In Step 210, a permission level associated with the client device is identified/accessed, in accordance with one or more embodiments. In one or more embodiments, the permission level is assigned on a per user basis, meaning it applies to all client devices owned by the same user, and identifies/specifies what entryways, if any, the user is permitted to access. Alternatively, the permission levels may be set on a per-device, or any other suitable basis.

In Step 215, a determination is made whether the permission level meets a second criterion, in accordance with one or more embodiments. In one or more embodiments, the second criterion is whether the permission level grants access to the entryway associated with the present physical location of the client device. If access to the entryway is not allowed, the method proceeds to Step 225. If access to the entry is allowed, the method proceeds to Step 220.

In Step 220, access is granted, in accordance with one or more embodiments. Specifically, access is granted because both the first and second criteria have been satisfied. Access to the entryway may include sending a message to a component of the entryway to unlock, open, or otherwise allow access. The message may be sent in any manner now known or later developed, using any suitable format. In one or more embodiments, the message is sent from a network device.

In Step 225, an alert is sent, in accordance with one or more embodiments. Step 225 is an optional step, as indicated by the dotted lines, and is reached when the client device does not have permission to access the entryway. The alert may be sent in any manner now known or later developed, and may be sent using any format. In one or more embodiments, the alert is sent to security personnel, and may indicate the location of the client device, as well as any other suitable information.

The following section describes various examples. The examples are included to aid in the understanding of the embodiments and are not intended to limit the scope of the embodiments.

As a first example, an employee is late driving to work, with his cell phone in his pocket. The employee parks his car in the employee parking lot and rushes towards the building on the sidewalk. As the employee nears the building, his cell phone is identified using Wi-Fi signals. These Wi-Fi signals are used to identify a location of the employee, based on the strength of the signals as received by the various network devices. Simultaneously, the employee's cell phone automatically connects to the employee network that is broadcasted by various network devices installed throughout the campus. The employee network is a secure network but, as the employee works for the company, he has the password needed to access the network. By logging on to the network, the employee automatically authenticates himself with the network devices.

Then, when the employee is on the sidewalk 20 feet from the sliding door entryway to his building (as identified using the Wi-Fi determined location), he passes through the predetermined zone for accessing the sliding door. Because the employee's cell phone has logged onto the employee Wi-Fi network, the permission levels of the employee are accessed, and it is determined that he is permitted to access this door/building. Thus, the system sends a command to the sliding door to open and, by the time the employee has walked the 20 feet to the sliding door, the door is already open and the employee is able to rush to his desk without having to touch his cell phone, badge, or other device to a receiver or other device.

Further, it will be apparent to one of ordinary skill in the art that there are many different ways to implement, and many different uses for, the one or more embodiments. For example, the backend software to be used could be any policy based network security software such as authentication, authorization and accounting (AAA) based or the ones used to provide Wi-Fi. This allows the categorizing of end users, carrying their Wi-Fi capable client devices, based on their role and the policy associated with that. As an example, apart from using the system/method/CRM as a means to control employee entrance, the system/method/CRM could be used at entrances to cinema halls in movie theater multiplexes. The patrons, when paying for their tickets, food, and beverages, are registering their client devices. The subsequent presence of the client devices near the entrance to a cinema hall, or food/beverage dispenser will allow/disallow them into the hall depending on what they paid for and/or dispense the food/beverages that they paid for. In the past network connectivity required physical entrance to buildings, with this system the physical entrance to the buildings is achieved by having network connectivity. As another example, when guests check into a hotel, they may register their client device with the hotel, and subsequently use their client device to open the door to their hotel room, pay for food/beverages, and/or any other suitable activity.

Figure 3:
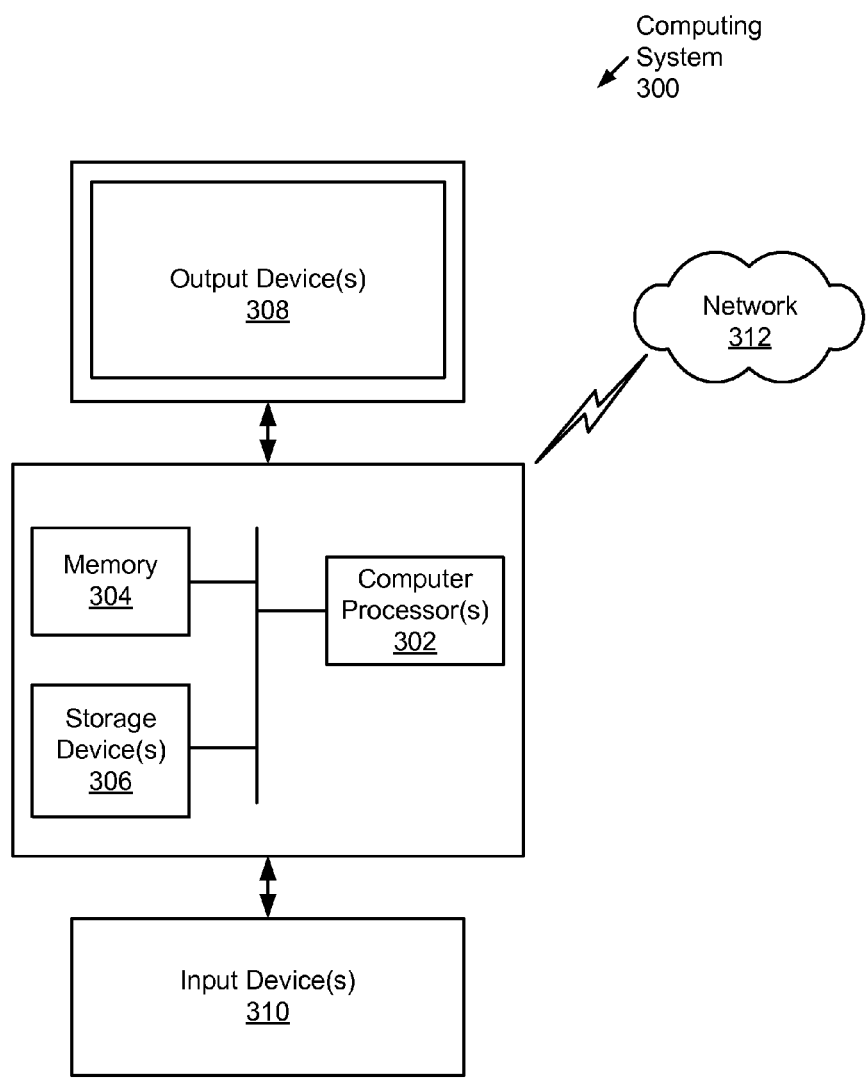
FIG. 3 shows a computer system in accordance with one or more embodiments.

Embodiments may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 3, the computing system (300) may include one or more computer processor(s) (302), associated memory (304) (e.g., random access memory (RAM), cache memory, flash memory, etc.), one or more storage device(s) (306) (e.g., a hard disk, an optical drive such as a compact disk (CD) drive or digital versatile disk (DVD) drive, a flash memory stick, etc.), and numerous other elements and functionalities. The computer processor(s) (302) may be an integrated circuit for processing instructions. For example, the computer processor(s) may be one or more cores, or micro-cores of a processor. The computing system (300) may also include one or more input device(s) (310), such as a touchscreen, keyboard, mouse, microphone, touchpad, electronic pen, or any other type of input device. Further, the computing system (300) may include one or more output device(s) (308), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (300) may be connected to a network (312) (e.g., a local area network (LAN), a wide area network (WAN) such as the Internet, mobile network, or any other type of network) via a network interface connection (not shown). The input and output device(s) may be locally or remotely (e.g., via the network (312)) connected to the computer processor(s) (302), memory (304), and storage device(s) (306). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (300) may be located at a remote location and connected to the other elements over a network (312). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions which, when executed by one or more devices, causes the one or more devices to:

identify a physical location of a first client device and a second physical location of a second client device;

determine that the physical location of the first client device and the second physical location of the second client device meet a first criterion for allowing access through an entryway;

identify a permission level associated with the first client device and a second permission level associated with the second client device;

determine that the permission level associated with the first client device meets a second criterion for allowing access through the entryway and that the second permission level associated with the second client device does not meet the second criterion;

calculate a distance between the first client device and the second client device;

responsive at least to a determination that the first criterion and the second criterion have been met by the first client device, allow the first client device access through the entryway;

determine based on the calculated distance, that the second client device gained unauthorized access through the entryway due to proximity with the first client device; and present an alert regarding the unauthorized access through the entryway of the second client device.

2. The non-transitory computer readable medium of claim 1, wherein to determine that the physical location of the first client device meets the first criterion, the instructions are further to cause the one or more devices to determine that a distance between the physical location of the first client device and a location of the entryway is below a threshold value.

3. The non-transitory computer readable medium of claim 1, wherein to determine that the permission level meets the second criterion, the instructions are further to cause the one or more devices to determine that the first client device has successfully connected to a particular WiFi network associated with access for the entryway.

4. The non-transitory computer readable medium of claim 1, wherein to determine that the physical location of the first client device meets the first criterion, the instructions are further to cause the one or more devices to determine that the physical location of the first client device is within a particular zone associated with the entryway.

5. The non-transitory computer readable medium of claim 1, wherein the instructions are further to cause the one or more devices to:

subsequent to allowing access: responsive to determining that the physical location of the first client device no longer meets the first criterion, block access through the entryway.

6. The non-transitory computer readable medium of claim 1, wherein to allow access, the instructions are further to cause the one or more devices to open a physical lock controlling the access through the entryway.

7. The non-transitory computer readable medium of claim 1, wherein the physical location of the first client device is determined based on one or more WiFi signals transmitted by the first client device and received by one or more access points installed on a ceiling near the entryway.

8. The non-transitory computer readable medium of claim 1, wherein to determine the physical location of the first client device, the instructions are further to cause the one or more devices to:

receive, by a plurality of access points, wireless signals from the first client device;

determine a distance of the first client device from each of the plurality of access points; and compute a location of the first client device based at least on: the distance of the first client device from each of the plurality of access points and a location of each of the plurality of access points.

9. The non-transitory computer readable medium of claim 1, wherein to determine the physical location of the first client device, the instructions are further to cause the one or more devices to:

receive, by at least one access point, wireless signals from the first client device;

determine a distance of the first client device from the at least one access point and a direction of the first client device from the at least one access point; and compute a location of the first client device based at least on: the distance of the first client device from the at least one access point and the direction of the first client device from the at least one access point.

10. A system comprising:

at least one network device including a hardware processor;

a memory on which is stored instructions that are to cause the hardware processor to:

identify a physical location of a first client device and a second physical location of a second client device;

determine that the physical location of the first client device and the second physical location of the second client device meet a first criterion for allowing access through an entryway;

identify a permission level associated with the first client device and a second permission level associated with the second client device;

determine that the permission level associated with the first client device meets a second criterion for allowing access through the entryway and that the second permission level associated with the second client device does not meet the second criterion for access through the entryway;

calculate a distance between the first client device and the second client device;

responsive at least to a determination that the first criterion and the second criterion have been met by the first client device, allow the first client device access through the entryway;

determine based on the calculated distance, that the second client device gained unauthorized access to the entryway due to proximity with the first client device; and present an alert regarding the unauthorized access through the entryway of the second client device.

11. The system of claim 10, wherein to determine that the physical location meets the first criteria, the instructions are further to cause the hardware processor to: determine that a distance between the physical location of the first client device and a location of the entryway is below a threshold value.

12. The system of claim 10, wherein to determine that the permission level meets the second criterion, the instructions are further to cause the hardware processor to: determine that the first client device has successfully connected to a particular WiFi network associated with access to the entryway.

13. The system of claim 10, wherein to determine that the physical location meets the first criterion, the instructions are further to cause the hardware processor to determine that the physical location of the first client device is within a particular zone associated with the entryway.

14. The system of claim 10, wherein the instructions are further to cause the hardware processor to:

subsequent to allowing access: responsive to determining that the physical location of the first client device no longer meets the first criterion, block access through the entryway.

15. The system of claim 10, wherein to allow access, the instructions are further to cause the hardware processor to open a physical lock controlling the access through the entryway.

16. The system of claim 10, wherein the physical location of the first client device is determined based on one or more WiFi signals transmitted by the first client device and received by one or more access points installed on a ceiling near the entryway.

17. The system of claim 10, wherein to determine the physical location of the first client device, the instructions are further to cause the hardware processor to:

receive, by a plurality of access points, wireless signals from the first client device;

determine a distance of the first client device from each of the plurality of access points; and compute a location of the first client device based at least on: the distance of the first client device from each of the plurality of access points and a location of each of the plurality of access points.

18. The system of claim 10, wherein to determine the physical location of the first client device, the instructions are further to cause the hardware processor to:

receive, by at least one access point, wireless signals from the first client device;

determine a distance of the first client device from the at least one access point and a direction of the first client device from the at least one access point; and compute a location of the first client device based at least on: the distance of the first client device from the at least one access point and the direction of the first client device from the at least one access point.

19. A method, comprising:

identifying respective physical locations of a first client device and a second client device;

determining that the respective physical locations of the first client device and the second client device meet a first criterion for access through an entryway;

determining, based on respective permission levels associated with the first client device and the second client devices, that the first client device meets a second criterion for authorized access through the entryway and that the second client device does not meet the second criterion for access through the entryway;

determining, by a hardware processor, based on a distance between the first client device and the second client device, that the second client device is piggybacking onto the first client device for unauthorized access through the entryway; and transmitting an alert regarding the unauthorized of the second client device to the entryway.

* * * * *